(12) United States Patent
Eastham

(10) Patent No.: US 7,350,075 B1
(45) Date of Patent: Mar. 25, 2008

(54) METHOD FOR AUTOCONFIGURATION OF AUTHENTICATION SERVERS

(75) Inventor: Paul Christopher Eastham, Half Moon Bay, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 719 days.

(21) Appl. No.: 10/059,815

(22) Filed: Jan. 28, 2002

(51) Int. Cl.
*G06F 11/30* (2006.01)
*G06F 12/14* (2006.01)
*G06F 7/04* (2006.01)
*G06F 7/58* (2006.01)
*G06F 17/30* (2006.01)
*H04L 9/32* (2006.01)
*H04L 9/00* (2006.01)
*G06K 9/00* (2006.01)

(52) U.S. Cl. .................... 713/168; 713/193; 713/167; 726/3; 726/4; 726/5; 726/6; 726/7; 726/28; 726/29; 726/30; 707/9; 707/10; 709/202; 709/203; 709/204; 709/205

(58) Field of Classification Search ........ 709/202–229; 713/201, 168–170; 726/1–3, 13
See application file for complete search history.

(56) References Cited

U.S. PATENT DOCUMENTS

| | | | | |
|---|---|---|---|---|
| 5,991,810 A | * | 11/1999 | Shapiro et al. | 709/229 |
| 6,263,369 B1 | * | 7/2001 | Sitaraman et al. | 709/225 |
| 6,321,259 B1 | * | 11/2001 | Ouellette et al. | 709/220 |
| 6,363,411 B1 | * | 3/2002 | Dugan et al. | 709/202 |
| 6,687,733 B2 | * | 2/2004 | Manukyan | 709/200 |
| 6,701,359 B1 | * | 3/2004 | Calabrez et al. | 709/223 |

* cited by examiner

*Primary Examiner*—Ayaz Sheikh
*Assistant Examiner*—Longbit Chai
(74) *Attorney, Agent, or Firm*—Blakely Sokoloff Taylor & Zafman LLP

(57) ABSTRACT

A network cache is automatically configured so that the network cache is able to communicate with a database to authenticate a user. A user ID is received as input and is used to query a database for objects having the user ID. The user object corresponding to the user ID is selected and the attributes within the user object are output to a user interface. The attribute name corresponding to the user ID is selected. Attribute names corresponding to group IDs in the user object are selected. If other forms of group membership exist, a non-parent object is retrieved and the attribute name corresponding to the group ID in the object is selected. Once each attribute name is selected the attribute name is stored in a configuration file in the network cache.

6 Claims, 4 Drawing Sheets

METHOD FOR AUTOCONFIGURATION OF AUTHENTICATION SERVERS

FIELD OF THE INVENTION

The present invention pertains to devices which proxy requests and responses between clients and servers on a computer network. More particularly, the present invention relates to a method and apparatus for automatic configuration of a device for use with various authentication protocols.

BACKGROUND OF THE INVENTION

Of the many uses of the Internet, one of the more common ones is to access content on a remote server, such as a World Wide Web server. Typically, a person operates a client device to access content on a remote origin server over the Internet. The client may be, for example, a personal computer (PC) or a handheld device such as a personal digital assistant (PDA) or cellular telephone. The client often includes a software application known as a browser, which can provide this functionality. A person using the client typically operates the browser to locate and select content stored on the origin server, such as a web page or a multimedia file. In response to this user input, the browser sends a request for the content over the Internet to the origin server on which the content resides. In response, the origin server returns a response containing the requested content to the client, which outputs the content in the appropriate manner (e.g., it displays the web page or plays the audio file). The request and response may be communicated using well-known protocols, such as transmission control protocol/Internet protocol (TCP/IP) and hypertext transfer protocol (HTTP).

For a variety of reasons, it may be desirable to place a device known as a proxy logically between the client and the origin server. For example, organizations often use a proxy to provide a barrier between clients on their local area networks (LANs) and external sites on the Internet by presenting only a single network address to the external sites for all clients. A proxy normally forwards requests it receives from clients to the applicable origin server and forwards responses it receives from origin servers to the appropriate client. A proxy may provide authentication, authorization and/or accounting (AAA) operations to allow the organization to control and monitor clients' access to content. A proxy may also act as (or facilitate the use of) a firewall to prevent unauthorized access to clients by parties outside the LAN. Proxies are often used in this manner by corporations when, for example, a corporation wishes to control and restrict access by its employees to content on the Internet and to restrict access by outsiders to its internal corporate network. This mode of using a proxy is sometimes called "forward proxying".

It is also common for a proxy to operate as a cache of content that resides on origin servers; such a device may be referred to as a "proxy cache". An example of such a device is the NetCache product designed and manufactured by Network Appliance, Inc. of Sunnyvale, Calif. The main purpose of caching content is to reduce the latency associated with servicing content requests. By caching certain content locally, the proxy cache avoids the necessity of having to forward every content request over the network to the corresponding origin server and having to wait for a response. Instead, if the proxy cache receives a request for content which it has cached, it simply provides the requested content to the requesting client (subject to any required authentication and/or authorization) without involving the origin server.

Proxy caches may be used by corporations and other institutions in the forward proxying mode, as described above. Proxy caches are also commonly used by high-volume content providers to facilitate distribution of content from their origin servers to users in different countries or other geographic regions. This scenario is sometimes called "reverse proxying". As an example of reverse proxying, a content provider may maintain proxy caches in various different countries to speed up access to its content by users in those countries and to allow users in different countries to receive content in their native languages. In that scenario the content provider "pushes" content from its origin servers to its proxy caches, from which content is provided to clients upon request.

Database-oriented authentication servers are often used in conjunction with proxy caches in order to restrict access to network content. The main purpose of an authentication server is to monitor and control user access to network content. The authentication server performs authentication, i.e., determines whether the user requesting access is who he claims to be, and the proxy cache performs authorization, i.e., determines whether the user is authorized to do what he is attempting to do. One way the proxy cache may be able to determine proper authorization is through an access control list (ACL). An ACL is defined by mechanisms and policies that restrict access to computer resources. An ACL specifies what operations different users can perform on specific files and directories. Various authentication protocols can be used to check usernames, passwords, and group memberships. Among them are Lightweight Directory Access Protocol (LDAP), Remote Authentication Dial-In User Service (RADIUS), Kerberos, and Windows NT/LAN Manager Authentication Protocol (NTLM).

Commonly, there are many configuration parameters needed to configure a proxy cache for use with authentication protocols. As a result, the configuration process is often done incorrectly by network operators or administrators. This consumes the time of technical support personnel and can result in disruptions in network data traffic. Network operators and administrators are often unaware of their database layout and thus have difficulty configuring the proxy cache to work with their databases.

SUMMARY OF THE INVENTION

The present invention includes a method and apparatus for automatically configuring a server. The method comprises automatically configuring a server so that the server is able to communicate with a database to authorize a user.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for automatic configuration of a device are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. For example, a feature, structure, act, etc. described in one embodiment may also be included in other embodiments. Thus, the present invention can include a variety of combinations and/or integrations of the embodiments described herein.

A method of automatically configuring a device is needed in order to simplify the configuration process and allow network operators and administrators to configure the device properly in less time. Although the techniques described herein are adaptable generally to devices that perform authentication and authorization, the following discussion will illustrate the use of a proxy cache in order to simplify discussion. In one embodiment, an authentication server configured to communicate using the LDAP protocol utilizes a database to organize information in a hierarchical manner using objects. At the top of the hierarchy, there is a grandparent object. Next there are objects defining different groups, such as engineering, accounting, or human resources. Lastly, there are user objects that may contain pertinent information regarding group membership and access privileges for each user. An automatic configuration of a proxy cache is performed so that the proxy cache is able to communicate with the database to authenticate a particular user. Access privileges may then be derived from the information contained in the user object. The autoconfiguration method comprises a proxy cache receiving a user ID as input and querying the database for the user ID. Objects containing the user ID are output to the operator terminal and the user object associated with the user ID is selected by the operator. The autoconfiguration program retrieves the user object and outputs attributes of the user object to the operator terminal. The operator then selects an attribute name associated with the user ID. The attribute name associated with one or more group ID's from the list of attributes of the user object may also be selected by the operator. Group ID's named in the user object are considered parental group ID's. If group memberships are specified in other objects as well, the autoconfiguration program retrieves the non-parent objects that refer to the user object, and the operator selects the attribute name associated with the non-parental group ID. Once the attribute names associated with the user ID, the one or more group IDs and the non-parental group ID are selected, they are stored on the proxy cache.

Figure 1:
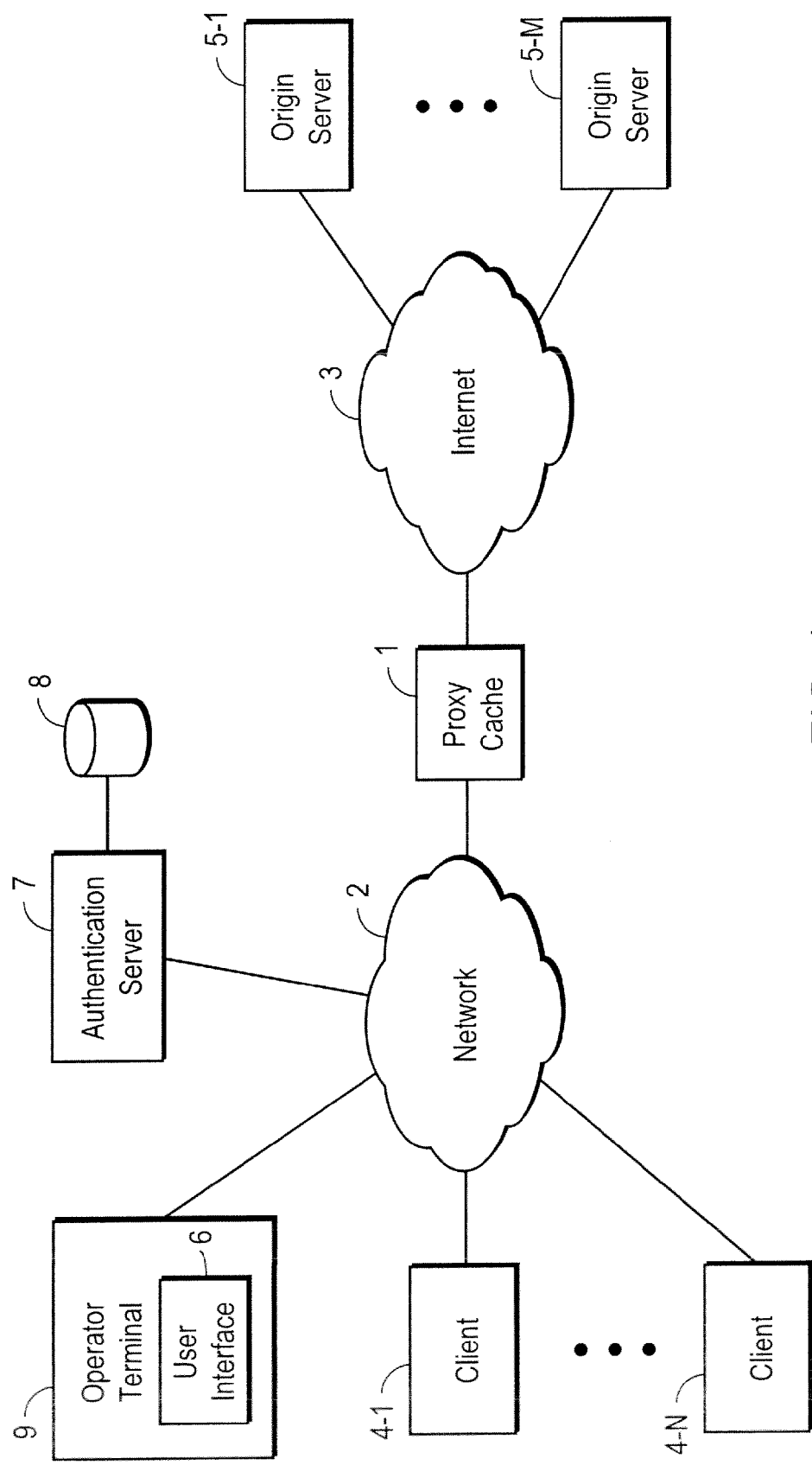
FIG. 1 illustrates a network environment in which a proxy cache according to the present invention may be implemented.

FIG. 1 illustrates an example of a network environment in which a proxy cache according to the present invention may be implemented. As illustrated, a proxy cache 1 configured according to the present invention is connected between a network 2 and the Internet 3. The network 2 could be a LAN, intranet, WAN or any combination thereof. A number (N) of clients 4-1 through 4-N are coupled to the network 2. An operator terminal 9 is coupled to the LAN 2 and a user interface 6, accessed from the operator terminal, is utilized to automatically configure the proxy cache 1 in this embodiment. An authentication server 7 and database 8 are also coupled to the network 2. The database 8 is utilized to store object information in the format dictated by the protocol used to communicate between the authentication server 7 and the proxy cache 1. A number (M) of origin servers 5-1 through 5-M are coupled to the Internet 3. The proxy cache 1 forwards requests from the clients 4 for content residing on the origin servers 5 and forwards content and/or other responses from the origin servers 5 to the appropriate clients 4. The proxy cache 1 also caches content from the origin servers 5. It may be assumed that the proxy cache 1 operates within a defined cache hierarchy.

Note that a proxy cache in accordance with the present invention can be used advantageously in network environments other than that shown in FIG. 1. For example, a proxy cache according to present invention need not be used to couple clients on a network to the Internet. In other embodiments, one or more other types of networks may be substituted for either the network 2 or the Internet 3 in the configuration of FIG. 1. Furthermore, a proxy cache may be used in either a forward proxying configuration or a reverse proxying configuration consistently with the present invention.

Figures 2, 3:
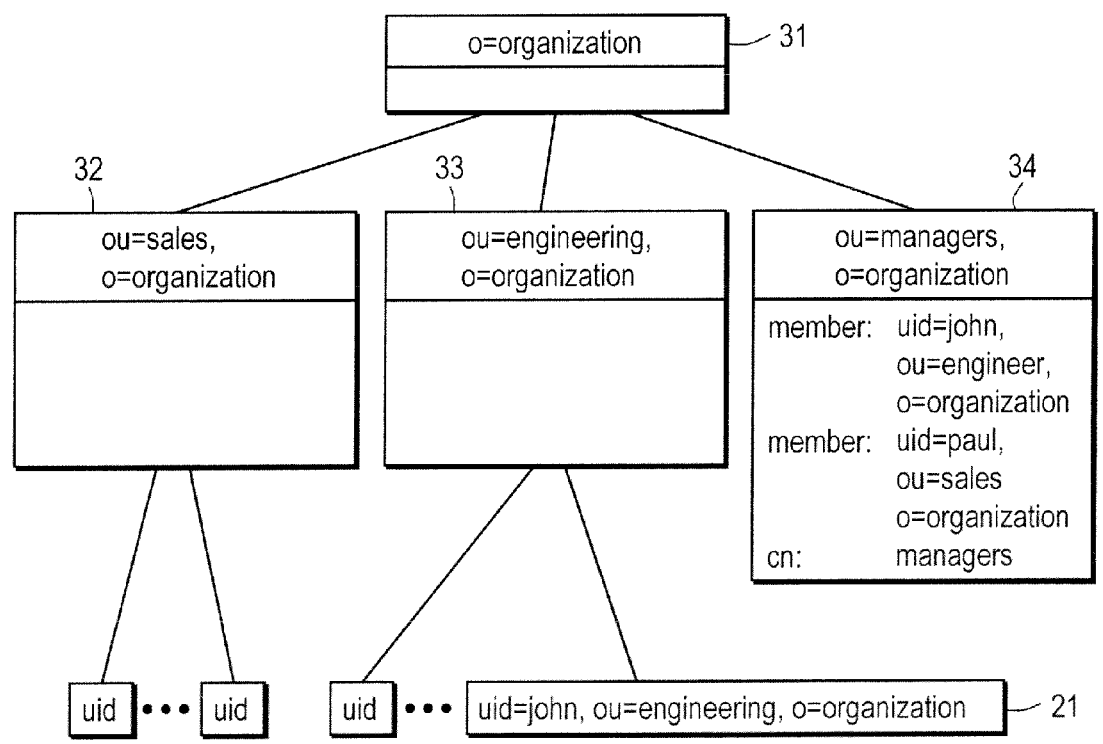
FIG. 2 illustrates an implementation of a user object according to one embodiment.
FIG. 3 illustrates an implementation of a hierarchical directory structure according to one embodiment.

FIG. 2 illustrates an example of a user object 21 which is used according to the techniques described herein. The user object 21 contains information that identifies a user served by authentication server 7, the groups of which the user is a member, and other information associated with the user. The database 8 stores a user object such as this for each user served by the authentication server 7. This information is utilized to authenticate and authorize the user when the user is requesting access to network content. As shown, a user object 21 contains a plurality of attributes that correspond to an attribute name. Each attribute details a different characteristic of the user. For example, in this example, cn (canonical name) is the attribute name that corresponds to the user's full name. Attribute names uid, fn, and ln correspond to the user's user ID, first name, and last name, respectively. The user object also includes the user's phone number, electronic mail address, organizational unit (ou), which is the attribute name for the parent group to which the user belongs, and organization (o), which is the grandparent of the user object in the hierarchy utilized in this embodiment.

FIG. 3 is an example of a hierarchical directory structure of database 8 that can be accessed using LDAP. Although the embodiment described below is adaptable for a variety of protocols, the following discussion will illustrate the use of an LDAP style directory in order to simplify discussion. The embodiment presented is intended to be an example of a hierarchical directory structure and is not intended to indicate limitations on the directory structure utilized herein. The hierarchical directory structure is made up of objects organized in a tree format. The directory structure is made up of parent objects, non-parent objects, and children. A parent object is an object that is pointed to by a child or other object. A non-parent object is an object that contains a pointer to a child or other object. In this embodiment, there is a grandparent object 31 to which group objects representing different units of a company are connected. Illustrated here, for example, are ou (organizational unit) objects representing sales 32, engineering 33, and managers 34. Connected as children of the various ou objects are the various user objects representing the users who belong to the respective organizational units. The ou object representing managers 34 has no objects connected as children and is a non-parental group object that would be utilized in this embodiment to contain, as members, users who are members of different ou's. In this example, managers is the attribute name corresponding to cn (canonical name). In addition object 34 contains, as members, John from engineering 33 and Paul from sales 32. Depending on the needs of a specific user and the size of a particular directory tree, a user object could be part of more than one group and could name more than one parent object if the directory structure allows for more than one parent object. The case where the directory structure allows for more than one parent object is considered a "directed graph" structure.

Figure 4:
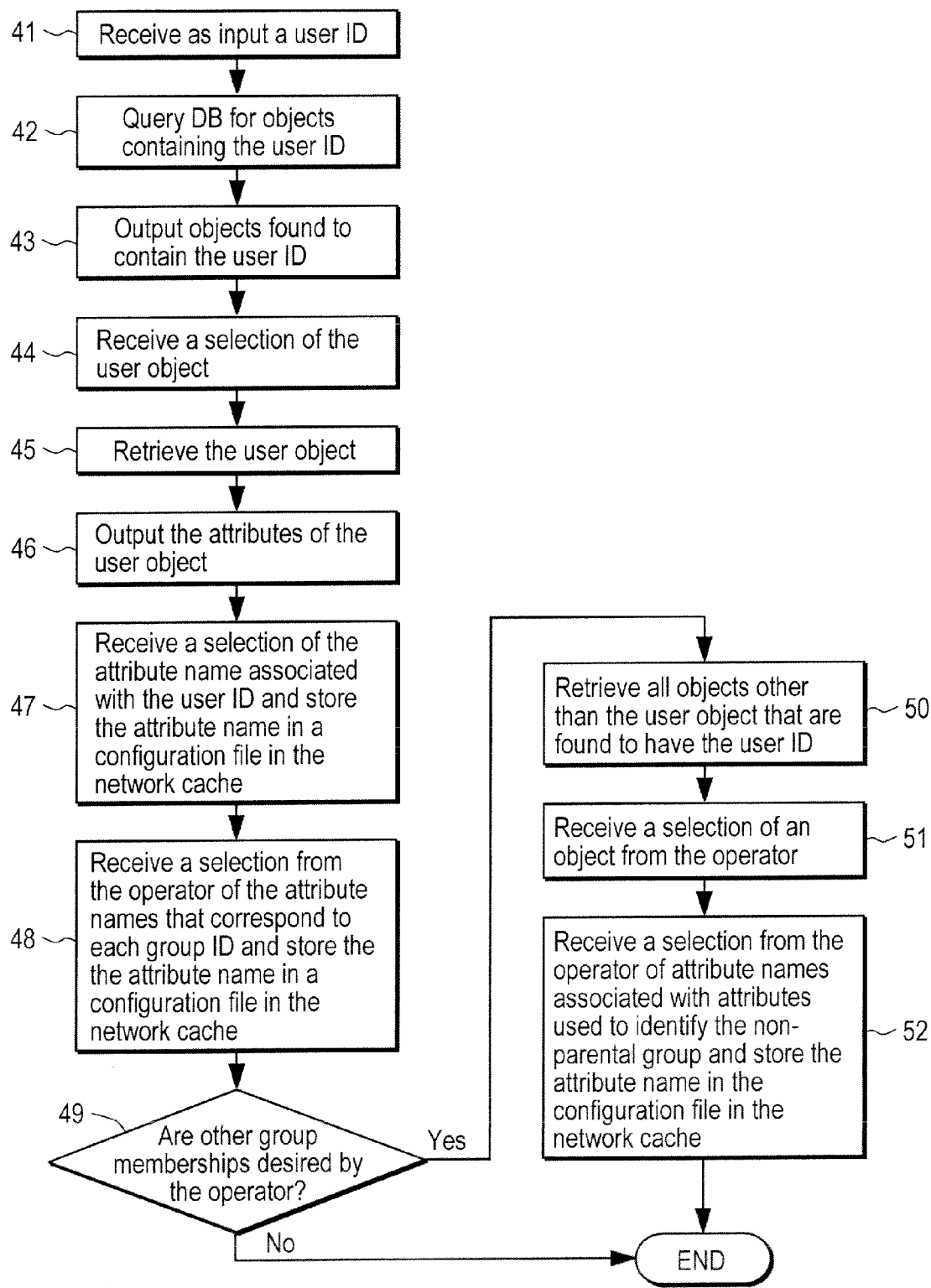
FIG. 4 is a flow diagram showing a process of automatically configuring the proxy cache, according to one embodiment.

FIG. 4 is a flowchart illustrating an embodiment of a process for automatically configuring the proxy cache 1 for authenticating a user, according to one embodiment. A user ID is received as input at the user interface 6 at block 41. The proxy cache 1 then searches the database 8 to find any objects containing the user ID as an attribute at block 42. Objects found to contain the user ID are output by the proxy cache 1 to the user interface 6 at block 43. The user object corresponding to the user ID is selected by an operator using user interface 6 at block 44. The user object is retrieved by the proxy cache 1 at block 45. The attributes of the user object are then output by the proxy cache 1 to the user interface 6 at block 46. The attribute name associated with the user ID is then selected by the operator using user interface 6 and stored by the proxy cache 1 in a configuration file at block 47. Using the example set forth in FIGS. 2 and 3, the operator will select uid because this is the attribute name that corresponds with john, the user ID located in user object 21 that the client will use to authenticate. Once the attribute name corresponding to the user ID is selected by the operator, other contents of the user object are selected by the operator in order to determine the attribute names associated with the group IDs of the user at block 48. Here the operator will select the attribute ou because this is the attribute name that corresponds to engineering, which is one of the parent group IDs located in user object 21. The grandparent group ID located in user object 21 is o, which is the attribute name corresponding to the organization. Once each attribute name is received as a selection, the attribute is stored by the proxy cache 1 in the configuration file at block 48. If the operator desires to select additional groups that are not parent or grandparent groups in block 49, the non-parent object(s) 34 are retrieved by the proxy cache 1 at block 50 and at least one of the non-parent objects is selected at block 51. The attribute name corresponding to the non-parental group ID ("cn" in the example) is then selected by the operator and stored by the proxy cache 1 in the configuration file at block 52.

In one embodiment, the proxy cache 1 can guess which attribute names to select once the user object has been retrieved by finding in the user object an attribute that contains a string that is not the user name and is also found in the canonical name of the user. The proxy cache 1 can also guess the identifying characteristics of non-parental objects by observing which attributes appear in the canonical name of the object and which variables change from group to group. In yet another embodiment of the invention, the attribute names stored in the proxy cache 1 can be checked to determine whether they are correct. After configuration, the operator would be prompted to enter a username. The proxy cache would then look up parental and non-parental groups for that user according to the configuration that was established. A list of groups found would then be presented to the operator to allow him to verify that all of the needed groups were indeed found for that user. The operator would be able to repeat this process several times with different usernames.

Figure 5:
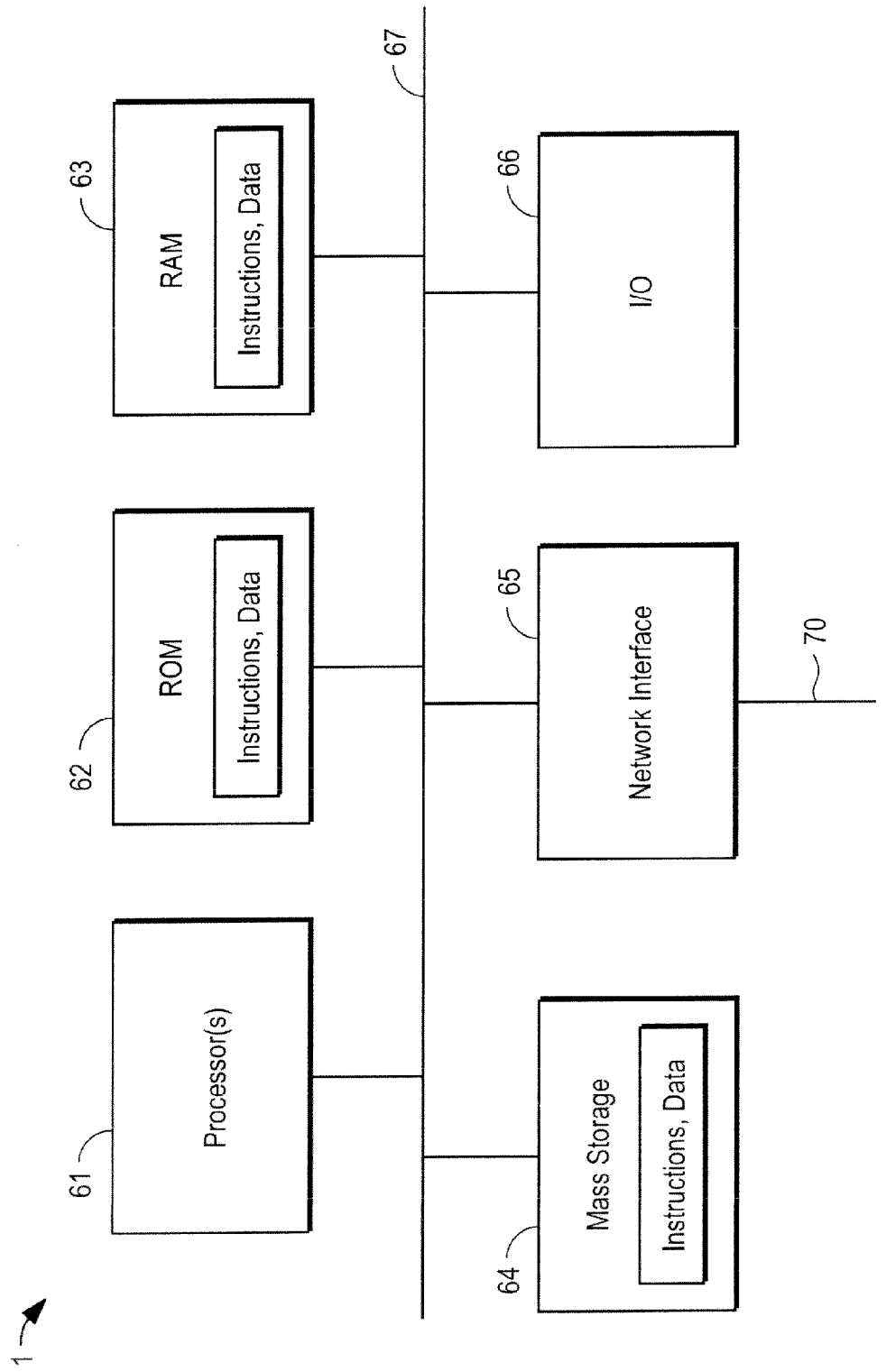
FIG. 5 is a block diagram showing an abstraction of the hardware components of the proxy cache, according to one embodiment.

FIG. 5 is a block diagram showing an abstraction of the hardware components of the proxy cache 1, according to one embodiment. Note that there are many possible implementations represented by this abstraction, which will be readily appreciated by those skilled in the art given this description.

The illustrated system includes one or more processors 61, i.e. a central processing unit (CPU), read-only memory (ROM) 62, and random access memory (RAM) 63, which may be coupled to each other by a bus system 67 and/or by direct connections. The processor(s) 61 may be, or may include, one or more programmable general-purpose or special-purpose microprocessors, digital signal processors (DSPs), programmable controllers, application specific integrated circuits (ASICs), programmable logic devices (PLDs), or a combination of such devices. The bus system (if any) 67 includes one or more buses or other connections, which may be connected to each other through various bridges, controllers and/or adapters, such as are well-known in the art. For example, the bus system 67 may include a "system bus", which may be connected through one or more adapters to one or more expansion buses, such as a Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

Also coupled to the bus system 67 are one or more mass storage devices 64, a network interface 65, and one or more input/output (I/O) devices 66. Each mass storage device 54 may be, or may include, any one or more devices suitable for storing large volumes of data in a non-volatile manner, such as a magnetic disk or tape, magneto-optical (MO) storage device, or any of various forms of Digital Versatile Disk (DVD) or CD-ROM based storage, or a combination thereof. RAM 63 and/or the mass storage device(s) 64 may be used to implement a content cache contained within the proxy cache.

The network interface 65 is one or more data communication devices suitable for enabling the processing system to communicate data with remote devices and systems via an external communication link 70. Each such data communication device may be, for example, an Ethernet adapter, a Digital Subscriber Line (DSL) modem, a cable modem, an Integrated Services Digital Network (ISDN) adapter, a satellite transceiver, or the like. Referring again to the embodiment of FIG. 1, the network interface 65 is used by the proxy cache 1 to communicate both over the network 2 and over the Internet 3. In particular, the network interface 65 is the communications interface by which the proxy cache 1 receives and communicates requests and responses between clients and servers. In addition, the network interface 65 may also be the communications interface by which a network administrator or operator accesses the proxy cache 1. Note that while only one external communication link 70 is illustrated, separate physical communication links may be provided for each network connection (e.g., to network 2, Internet 3), although that is not necessarily the case.

Since proxy cache 1 may be accessed by a user via network interface 65, proxy cache 1 does not necessarily require its own I/O devices 66. Nonetheless, such I/O devices may be included in some embodiments and may include, for example, a keyboard or keypad, a display device, and a pointing device (e.g., a mouse, trackball, or touchpad).

The above-described processes and techniques (e.g., automatic configuration) may be implemented at least partially in software. Such software may be part of the operating system of the proxy cache 1. Such software may reside, either entirely or in part, in any of RAM 63, mass storage device(s) 64 and/or ROM 62. Such software may be executed by the processor(s) 61 to carry out the described processes and techniques.

Thus, a method and apparatus for automatic configuration of a proxy cache have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of configuring a network cache to communicate with an authentication server, the method comprising:
    receiving at the network cache, from an operator, a first user input specifying a user ID, the user ID representing an identify of a user who is to be authenticated by the network cache during a subsequent authentication;
    in response to the first user input, identifying one or more objects that contain the user ID in an authentication database associated with an authentication server, the authentication database containing information relating to a plurality of users to be authenticated by the network cache during subsequent authentication;
    retrieving each said identified object that contains the user ID from the authentication database and causing information identifying each said object to be output to the operator;
    receiving at the network cache a second user input from the operator, indicating a selection by the operator of an object of said one or more objects, said object containing a plurality of attributes and a separate attribute name for each of the attributes;
    in response to the second user input, causing the attributes in the object and the names of the attributes to be output to the operator;
    receiving at the network cache a third user input from the operator, specifying a name of an attribute which contains the user ID in the object;
    storing, in a configuration database of the network cache, the name of the attribute which contains the user ID, for use by the network cache during subsequent authentication;
    receiving at the network cache a fourth user input from the operator specifying a name of an attribute which contains a group ID in the object, the group ID representing an identify of a group to which the user belongs; and
    storing, in the configuration database, the name of the attribute which contains the group ID, for use by the network cache during subsequent authentication.

2. A method as recited in claim 1, further comprising:
    at the network cache, using the information in the configuration database to communicate with the authentication server.

3. A machine-readable storage medium storing instructions which, when executed by a processor in a network cache, cause the network cache to perform a process that comprises:
    receiving at the network cache, from an operator, a first user input specifying a user ID, the user ID representing an identify of a user who is to be authenticated by the network cache during a subsequent authentication;
    in response to the first user input, identifying one or more objects that contain the user ID in an authentication database associated with an authentication server;
    causing information identifying each said object that contains the user ID to be output to the operator;
    receiving at the network cache a second user input from the operator, indicating a selection by the operator of an object of said one or more objects, said object containing a plurality of attributes and a separate attribute name for each of the attributes;
    in response to the second user input, causing the attributes in the object and the names of the attributes to be output to the operator;
    receiving at the network cache a third user input from the operator, specifying a name of an attribute which contains the user ID in the object; and
    storing, in a configuration database of the network cache, the name of said attribute which contains the user ID, for use by the network cache during subsequent authentication.

4. A machine-readable storage medium as recited in claim 3, wherein said process further comprises:
    receiving at the network cache a fourth user input from the operator specifying a name of an attribute which contains a group ID in the object, the group ID representing an identify of a group to which the user belongs; and
    storing, in the configuration database, the name of the attribute which contains the group ID, for use by the network cache during subsequent authentication.

5. A machine-readable storage medium as recited in claim 4, wherein said process further comprises:
    at the network cache, using the information in the configuration database to communicate with the authentication server.

6. A machine-readable storage medium as recited in claim 5, wherein the authentication database contains information relating to a plurality of users to be authenticated by the network cache during subsequent authentication.

* * * * *